(12) United States Patent
Rosenkranz et al.

(10) Patent No.: US 10,060,779 B2
(45) Date of Patent: Aug. 28, 2018

(54) DEVICE AND METHOD FOR CONTINUOUS MEASUREMENT OF THE DYNAMIC FUEL CONSUMPTION OF AN INTERNAL COMBUSTION ENGINE

(71) Applicant: AVL LIST GMBH, Graz (AT)

(72) Inventors: Anton Rosenkranz, Graz (AT); Klaus-Christoph Harms, Thal/Graz (AT); Michael Wiesinger, Graz (AT)

(73) Assignee: AVL List GmbH, Graz (AT)

( * ) Notice: Subject to any disclaimer, the term of this patent is extended or adjusted under 35 U.S.C. 154(b) by 230 days.

(21) Appl. No.: 14/904,607

(22) PCT Filed: Jun. 20, 2014

(86) PCT No.: PCT/EP2014/063022
§ 371 (c)(1),
(2) Date: Jan. 12, 2016

(87) PCT Pub. No.: WO2015/003887
PCT Pub. Date: Jan. 15, 2015

(65) Prior Publication Data
US 2016/0153818 A1    Jun. 2, 2016

(30) Foreign Application Priority Data
Jul. 12, 2013  (AT) .............................. A 50453/2013

(51) Int. Cl.
*G01F 9/00* (2006.01)
*G01L 3/26* (2006.01)
(Continued)

(52) U.S. Cl.
CPC ........... *G01F 9/001* (2013.01); *F02D 33/003* (2013.01); *F02M 37/0058* (2013.01);
(Continued)

(58) Field of Classification Search
USPC .............................. 73/114.52, 114.53, 114.54
See application file for complete search history.

(56) References Cited

U.S. PATENT DOCUMENTS

| 3,831,439 A | 8/1974 | Konomi ..................... 73/114.52 |
| 4,404,847 A | 9/1983 | Larson ...................... 73/114.42 |

(Continued)

FOREIGN PATENT DOCUMENTS

| JP | 62116217 | 5/1987 |
| JP | 7128110 | 5/1995 |

OTHER PUBLICATIONS

English abstract of JPS62116217.
English abstract of JPH07128110.

*Primary Examiner* — Clayton E Laballe
*Assistant Examiner* — Warren K Fenwick
(74) *Attorney, Agent, or Firm* — Dykema Gossett PLLC

(57) ABSTRACT

For continuous measurement of the dynamic fuel consumption of an internal combustion engine with a venting tank (10) which is disposed in a return line (11) from the outflow side (12) of the fuel system (7) and is also connected to the intake line (13) to the fuel system, a filling level regulator (15) is provided at a connection of the venting tank (10) and has a circulation pump (22) as well as a control valve (9) connected thereto, through which the flow passes continuously, and which is opened more or less as a function of the filling level to be regulated. Thus apparent consumptions occurring in specific operating states of the internal combustion engine can be avoided but can also be taken into account as corrections.

21 Claims, 6 Drawing Sheets

(51) Int. Cl.
*G01M 15/00* (2006.01)
*F02D 33/00* (2006.01)
*F02M 37/00* (2006.01)
*F02M 37/20* (2006.01)

(52) U.S. Cl.
CPC ........ *F02M 37/0088* (2013.01); *F02M 37/20* (2013.01); *F02D 2200/0625* (2013.01)

(56) References Cited

U.S. PATENT DOCUMENTS

| | | | | |
|---|---|---|---|---|
| 4,990,780 | A | * | 2/1991 | Lee ........................ G01N 21/39 |
| | | | | 250/339.13 |
| 5,205,160 | A | | 4/1993 | Gandini ..................... 73/114.52 |
| 5,445,964 | A | * | 8/1995 | Lee ........................ G01N 21/39 |
| | | | | 250/343 |
| 5,708,201 | A | | 1/1998 | Kaub ......................... 73/114.42 |
| 7,669,463 | B2 | | 3/2010 | Scheid ....................... 73/114.52 |
| 7,677,093 | B2 | | 3/2010 | Christian et al. ........... 73/114.52 |
| 9,488,122 | B2 | | 11/2016 | Kammerstetter ..... F02D 41/22 |
| 2010/0083770 | A1 | | 4/2010 | Köck et al. |

* cited by examiner

DEVICE AND METHOD FOR CONTINUOUS MEASUREMENT OF THE DYNAMIC FUEL CONSUMPTION OF AN INTERNAL COMBUSTION ENGINE

BACKGROUND OF THE INVENTION

Field of the Invention

The invention relates to a device for continuous measurement of the dynamic fuel consumption of an internal combustion engine, with a venting tank which is disposed in a return pipe from the outflow side of the fuel system of the internal combustion engine and which is also connected to the inlet pipe of the measuring system for supplying the fuel system of the internal combustion engine and has a filling level regulator for keeping the fuel mass in the filling volume at least largely constant. Furthermore, the invention also relates to a corresponding method, wherein unconsumed fuel returned from the fuel system of the internal combustion engine is degassed in a venting tank, of which the filling level is kept at least mostly constant, and is again added to the inlet to the inflow side of the fuel system of the internal combustion engine.

The Prior Art

For research and development of internal combustion engines, it is important for the fuel consumption—that is, the fuel mass actually introduced into the combustion chamber of the internal combustion engine per unit of time—to be measured in an up-to-date and accurate manner. The supply of liquid fuel, for example petrol or diesel, to the internal combustion engine on the test bench or in the respective application usually takes place from a tank wherein, depending upon the type of system for introducing the fuel into the combustion chamber—in many cases an injection system—there is excess fuel which, amongst other things, also serves for cooling and lubrication of the injection system and is conveyed back to the tank by a return pipe. There the returned fuel is brought to the temperature level prevailing in the tank, and any gas content present in the form of bubbles is removed. In such systems with a return flow the fuel consumption is provided by the difference between the fed and returned fuel mass, wherein the following measuring arrangement has proved reliable for measurement:

Fuel from the tank is fed by gravity or with the aid of a fuel pump to a consumption sensor for measurement of the fuel intake and onwards to a conditioning unit, in which, on the one hand, a necessary fuel overpressure or underpressure is set with the aid of a pump and optionally by means of pressure regulators; on the other hand, and above all, a defined fuel temperature is set there with a heat exchanger. The injection system of the internal combustion engine takes the fuel (fuel feed) from this conditioning unit. In the interior of the injection system of the internal combustion engine (and therefore not accessible for the consumption measurement in general, or only by means of the data output from the internal combustion engine control unit (ECU), for example for the rail pressure), in many cases a backing pump generates a low pressure, a high-pressure pump generates a high pressure, and a pressure or quantity control system generates the supply pressure required by the internal combustion engine control unit (rail pressure, generally simply the high pressure) for supplying the injectors. In such arrangements the excess fuel arrives with a generally very low overpressure in the fuel return flow and a bypass line disposed in the consumption measurement system parallel to the internal combustion engine, wherein pressure control systems which are, in any case, provided there ensure that the feed flow and the return flow have a negligibly small pressure difference or the pressure prescribed for the feed flow in the system prevails. The bypass line is also required in the entire measurement circuit for a continuously strong fuel circulation which is independent of the current fuel consumption of the internal combustion engine, and this enables a fast reaction of the temperature control in the conditioning unit.

Due to the measurement, the fuel return flow from the internal combustion engine should no longer be guided past the consumption sensor directly in the tank, but must remain in the measurement circuit and be delivered to the line between the consumption sensor and the conditioning unit. This is readily possible if the quantity of gas contained in the returned fuel is negligibly small. However, in some systems of this type the quantity of gases transported with the returned fuel (vaporized fuel and optionally also compressed air and combustion gas from the internal combustion engine) may be considerable, so that the gas volume introduced into the fuel circuit would not only restrict the functioning of the internal combustion engine but would also constitute a negative apparent consumption and thus would considerably disrupt the measurement. Therefore the gas from the returned fuel must be removed as completely as possible. For this purpose it is known to provide a so-called venting tank before or at the confluence of the returned fuel and the fuel fed from the consumption sensor, so that the conditioning unit, and consequently the internal combustion engine, can be supplied with bubble-free fuel. This venting tank is optionally also operated at a pressure which is raised or lowered relative to atmospheric pressure in the fuel and in the gas located above it, in order thus to simulate the real situation as well as possible with a tank which is mounted higher or lower than the internal combustion engine, or with a fuel withdrawal pump.

In order that the consumption sensor disposed in the fuel intake of such a device can measure the actual consumption in an up-to-date and accurate manner and indicate the least possible apparent consumption, the fuel mass must be as constant as possible in the entire measurement circuit (and above all in the venting tank with its relatively large volume). For this reason, in known fuel consumption measuring arrangements of this type (see for example EP 1729100 A1, U.S. Pat. No. 5,708,201 or AT 505 014 B1) an intake valve controlled by a floating body is provided on the venting tank and opens the intake when the filling level in the venting tank falls below a specific level. In this way it should be ensured that precisely so much fuel reaches the venting tank from the consumption sensor that the fuel mass in the venting tank remains constant. However, this only functions on the condition that at any time a greater volume of fuel is removed from the venting tank via the feed flow than is delivered via the return flow. In reality, however, at times a greater volume can be delivered than removed, for example upon stopping of the Internal combustion engine, when the quantity of fuel stored in the high-pressure part of the injection system flows back, or upon reduction of the quantity injected and the speed of the internal combustion engine (coast-down). In such cases the filling level continues to rise in spite of the shut-off intake and with the shut-off valve shut off the consumption sensor does not report the return flow as negative (apparent) consumption, but zero consumption. As soon as a greater volume is removed from the measurement circuit than is returned, the increased level in the venting tank can be reduced in the course of time until the intake valve opens again in order not to let the level fall any further, whereby the consumption sensor can only measure the consumption correctly again from this time on. Above all, in the case of internal combustion engines with a large quantity of gas in the return line, this leads to considerable difficulties and inaccurate measurements: For example in the case of large diesel engines the transported quantity of gas can at times constitute a multiple of the returned volume of fuel.

Moreover, there are regions in the measurement circuit in which there are unavoidable changes to the fuel mass contained therein, such as in particular the fuel return flow with gas bubbles and raised temperature as well as in principle the volumes in the injection system of the internal combustion engine which are not accessible to the consumption measurement system or are only accessible by means of the data output of the internal combustion engine control unit (ECU). Any change to the fuel mass stored in the measurement circuit constitutes an apparent consumption and—if this leads to a corresponding through flow of fuel in the consumption sensor—is registered by the consumption sensor just like the fuel consumption given by the combustion in the engine. Thus the consumption indicated by the consumption sensor is not the actual fuel consumption, but usually also contains the apparent consumption as a measurement error.

The object of the present invention is to avoid the addressed disadvantages of the known devices and methods for continuous measurement of the dynamic fuel consumption of an internal combustion engine and to improve such a device or such a method so that the fuel mass contained in the measurement circuit is kept as constant as possible under all possible operating conditions, and the further remaining and potentially unavoidable changes to the fuel mass located in the measurement circuit can be taken into account by computation as accurately as possible in the determination of the actual fuel consumption of the internal combustion engine.

SUMMARY OF THE INVENTION

In a device according to the invention this object is achieved in that the filling level regulator located at a connection of the venting tank has a circulation pump as well as a control valve connected thereto, through which the flow passes continuously, and which is opened more or less as a function of the filling level to be regulated. Accordingly, in a method according to the invention a delivery or removal of medium which is regulated as a function of the filling level takes place continuously at one of the connections of the venting tank. Thus the control valve of the venting tank is not operated as usual in the vicinity of the "open/closed" switch point, but regardless of the current fuel consumption in an operating point with a permanent fluid flow which is maintained by a circulation pump. In this case the circulation pump and the control valve can preferably be disposed in a circulation line between the venting tank and the inlet pipe for the fuel. The arrangement in a withdrawal line of the venting tank or on a degassing connection can also advantageously be the same.

Accordingly, in the method according to the invention a continuous circulating flow of fuel can take place between the venting tank and either the fuel intake or withdrawal line. On the other hand, a continuous delivery or discharge of gaseous medium can advantageously also be carried out on the degassing connection of the venting tank.

In all variants, the respective medium or the continuous flow of medium through the control valve, which is opened in a controlled manner depending upon the location where it is installed, can either continuously flow into the venting tank or out of this tank, so that on the one hand a hysteresis-free filling level regulation takes place, and on the other hand not only an increase but also a decrease in the fuel mass, which is ultimately to be kept constant, can be taken into consideration.

Thus the fluid flowing in the control valve and in the circulation pump can (advantageously) be fuel which is free of gas bubbles at one of the connections of the venting tank, or can even be the gas or the air in the degassing line of the venting tank.

In one of the embodiments described above, the circulating flow of the fluid (fuel and/or venting gas) from and back into the venting tank, which is maintained by the circulation pump, causes the fluid to flow continuously into the venting tank through the partially-opened control valve. In this case the regulating position of the control valve, controlled as a function of the filling level of the fuel in the venting tank, determines whether more fluid is delivered to the venting tank or withdrawn from it. In this way the filling level in the tank is kept constant and an otherwise possible overfilling of the tank is counteracted.

Practically, and in general, the circulation pump is operated so that it conveys from a lower to a higher pressure level. Therefore, according to the given pressure conditions in the system, it may also be advantageous to reverse the above-mentioned flow direction, so that then the continuous fluid flow through the control valve does not lead into the tank but out of the tank.

In a further embodiment of the invention, an overpressure valve can be disposed in parallel with the circulation pump and opens when the pressure difference generated by the circulation pump is higher than a permissible value, and causes an Impermissibly high pressure to be reduced correspondingly.

In a further embodiment of the device according to the invention, it is provided that the venting tank has at least two regions which are separated by fittings 25, and which communicate hydraulically with negligible flow resistance and in each case have the same pressure on their connection. If the filling level in one of these regions filled with calmed and bubble-free fuel filled is used and kept constant for controlling the control valve, in this way it is ensured that with a corresponding geometry (namely filling volume proportionate to the filling level) and with otherwise constant pressure and temperature conditions, the fuel mass contained in the entire venting tank remains constant and largely independent of the thorough foaming and of the filling level of the other region which serves for gas removal. In this case the fuel which is potentially thoroughly foamed and rich in gas bubbles advantageously reaches a region for optimal elimination of the entrained gas bubbles, which can be supported for example by installed grids, nets or baffle plates, onto which the flow impinges at a suitable flow rate, or by cyclone-like devices or the like. From this gas elimination region, by means of fittings which prevent further entrainment of gas bubbles the fuel then arrives, practically free of gas bubbles and calmed, in another region in which the filling level is advantageously tapped, for example in the usual way with a floating body or by sensors which operate according to one of the many possible measurement principles (capacitive, inductive, optical, thermal, acoustic, etc.).

The venting tank with control valve can be disposed at the confluence of the fuel supplied by the consumption sensor and the fuel returned from the internal combustion engine, wherein it is advantageous if the control valve and circulation pump are disposed in the fuel intake of the consumption sensor in the venting tank and the circulation pump continuously draws in bubble-free fuel from the venting tank and delivers it to the line between the consumption sensor and the Intake valve. In this way, not only is it possible to counteract a risk of a drop in the filling level in the venting tank be counteracted by further opening of the control valve and an increased inflow from the consumption sensor, but also a risk of a raised level in which in fact the intake valve opens less wide and the circulation pump delivers the excess fuel to the consumption sensor, so that this sensor can make an up-to-date measurement of the negative consumption at that moment. Thus a so-called "open" consumption sensor is used which also allows a return flow and can detect this correctly.

In the design of the control valve for the device according to the Invention, care should naturally be taken to ensure that the quantity of fluid flowing through the control valve is provided by the sum of circulating flow and the intake or outlet flow.

According to a particularly preferred embodiment of the invention, the venting tank with the control valve is disposed close to the internal combustion engine, preferably where a bypass line and the return line are combined. In this way the return line up to the fuel intake is operated with bubble-free fuel, so that not only the fuel mass contained in the venting tank but also the fuel mass contained in the return flow can be kept largely constant.

In the case of fuel as a circulating fluid, a fuel pump also otherwise required in the measuring system, for instance the pump disposed in the intake line for withdrawal of fuel from the tank, or the pump disposed in the conditioning unit for maintaining the circulation in the entire measurement circuit, can serve directly as a circulation pump. In this way further expenditure in this connection can be avoided.

In the case of the arrangement of circulation pump and control valve at a degassing connection of the venting tank, it can always be ensured that the exactly correct quantity of venting gas or air is introduced or withdrawn, in order to maintain the filling level in the venting tank and the pressure in the return flow and to keep it constant. In this situation, and if the pressure in the venting tank is to be kept higher than the atmospheric pressure, a compressor pump of a compressed air system of the internal combustion engine (if present) can advantageously serve directly as a circulation pump and can convey compressed air into the venting tank for maintaining a degassing flow.

In many cases, however, it is advantageous in the last-mentioned context if bubble-free fuel flows through the control valve, for which purpose it is practical for it to be disposed in the withdrawal line of the venting tank, that is to say in the return line to the consumption sensor and to the conditioning unit in the feed flow. In this case, however, attention should be paid to whether the regulation is positive or negative. The control valve in the withdrawal line must open further as the filling level rises and must close further as the filling level falls. Furthermore, in this arrangement it is advantageous that the fuel pump already existing in the conditioning unit can serve directly as a circulation pump which maintains a continuous circulation of the fuel in the entire measurement circuit.

Furthermore, an additional conditioning unit can advantageously be provided for temperature conditioning of the returned fuel. For the aim of keeping the fuel mass in the measurement circuit as constant as possible, it is not sufficient to satisfy the requirement of conditioning the pressure and temperature of the feed flow, but the return flow and the venting tank should also be operated at an optimal and largely constant temperature and thus an excess of the heat introduced into the return flow from the internal combustion engine should be drawn off. In this case it is very important also to consider control of the latent heat transported with the gas bubbles and changes thereto. In the case of evaporation of the hot fuel into the gas bubbles, evaporation heat must be applied which cools the fuel. On the other hand, in the case of condensation of the vapors contained in the gas bubbles, condensation heat is released and causes heating of the fuel. The removal of the gas bubbles in the venting tank advantageously takes place at a high fuel temperature, which results in a lower viscosity of the fuel and makes it easier for the gas bubbles to rise and to escape. Suitable means are for example the raised return flow temperature supplied by the internal combustion engine or advantageously a discrete reheating effected in the return flow conditioning or thermostatic control. For good intermixing of the returned fuel with the fuel delivered from the consumption sensor, the two liquids should have the same temperature as far as possible, and this temperature should be as constant as possible and close to the set-point temperature of the feed flow conditioning. Therefore it is particularly advantageous to dispose the preconditioning unit in a region of the hydraulic connection of the separation region and mixing region of the venting tank. In this case it is also advantageous if the mixing region of the venting tank has fluidic fittings which support a turbulent flow and intermixing of the returned fuel and the fuel delivered by the sensor.

In order to take account as accurately as possible, by computation in the measurement circuit, of the remaining and potentially unavoidable fluctuations of the fuel mass, resulting in particular from the following changing influences:

the quantity of gas introduced (which is in particular vaporized fuel as well as compressed air and combustion gas from the internal combustion engine), which to some extent displaces the fuel located in the measurement circuit and changes the effective compressibility and the effective coefficient of expansion of the fuel, pressures in the part-volumes associated with the measurement circuit with a given elasticity of the walls (pipes, hoses) of the measurement circuit and effective compressibility of the fuel together with the quantity of gas contained therein, temperatures in the part-volumes associated with the measurement circuit with a given coefficient of expansion of the walls of the volume and effective pressure dependence of the density of the fuel together with the quantity of gas contained therein, in a method according to the invention it is also provided that in an identification phase the apparent consumption occurring is measured at least at one operating point of the internal combustion engine with a previously known fuel consumption, and is detected depending upon the values determined, at least approximately, for temperature and pressure of the fuel in the part-volumes of the measurement circuit and upon significant operating variables of the internal combustion engine, in particular upon the values output by the internal combustion engine control unit (ECU) for engine speed, current fuel consumption and rail pressure, and the definitive parameters for an apparent consumption are determined from these data and are taken into account by modelling in the actual consumption measurement, This is based on a model of the measurement circuit which is known per se with part-volumes for which in each case a uniform, average concentration of introduced gas can be assumed or at least determined approximately and in which in each case there are uniform effective pressure and temperature dependences of the fuel mass contained therein and in which at least one of the values for pressure and temperature can be measured or at least determined approximately.

The preferred mode of operation of the internal combustion engine in the identification phase is trailed operation with zero consumption, wherein the towing can take place (on the test bench) either by an external drive unit or also by the moment of inertia of the internal combustion engine itself or of a connected flywheel or the like. It should be noted here that the consumption measurement according to the invention (device and method) can of course take place both on the test bench and also on a properly used and fitted internal combustion engine (for example stationary or in a vehicle); however, in the case of non-stationary use, restrictions, in particular due to changing accelerations, cannot be ruled out.

In a further preferred embodiment of the method according to the Invention, self-learning algorithms which are known per se can be used for adaptation to changes during the measurement operation and for ongoing optimization of the accuracy of measurement, wherein preferably the measured or predetermined values, in particular for pressures, temperatures and fuel consumption, and the values provided by the Internal combustion engine control unit for engine speed, rail pressure and current fuel consumption, in each case are evaluated together not only with their absolute value, but in particular also with the value of their change, in order to determine the model-related redundancy of these values for the determination of Important system variables, in particular volumes, densities, compressibilities, coefficients of expansion, and time constants of the response behavior of the measurement lines and sensors. With a knowledge of such system variables and associated state variables the current apparent consumption can be calculated by modelling and the actual consumption can be continually compensated or determined from the current measured values and calculated values of the apparent consumption and can be output.

The required variables can either be measured in the usual way or determined approximately. The fuel mass contained in the part-volumes of the fuel feed flow is influenced significantly by the pressures and temperatures previously known in the measuring method. In the fuel return flow the gas input is to a large extent dependent upon the engine speed and load of the internal combustion engine, wherein the load is substantially correlated with the current fuel consumption and the characteristic of the gas input can be determined approximately by a measurement in trailed operation at zero load. The same also applies to the temperature of the fuel return flow after fueled operation of the internal combustion engine.

A model of the measuring system identified in this way also be used advantageously for monitoring the measurement circuit and for fault diagnosis, as a fuel consumption which is known or determined in some other way, preferably a zero consumption, is compared with the consumption determined by the measuring system. This may also make use of the continuously updated system parameters and the monitoring of any changes which occur, which can supply the user or service engineer with useful indications of impermissible changes to and defects of the measurement circuit and measuring system. In this case, however, for significant improvement of the accuracy of measurement it is frequently sufficient, instead of a complicated model-based calculation with many parameters which are only known approximately, if the apparent consumption occurring in characteristic phases of the test run, as identified in the identification phase, is taken into account in a very pragmatic, additive or subtractive manner. Such characteristic phases for determining and taking account of characteristic values of apparent consumption are characterized in particular by the transitions between different operating points of the internal combustion engine. For example, on the cold internal combustion engine and in trailed operation (zero consumption) a start-stopmaneuver can be carried out and the apparent consumption which occurs, as well as optionally the temperature of the fuel return flow, can be measured. With a similarmaneuver in fueled operation of the internal combustion engine, practically the same apparent consumption occurs and thus can be very simply taken into account by addition or subtraction, wherein scaling can usefully be carried out with the current return flow temperature.

In a similar way, with a fast change of engine speed (speed ramp) it is possible to determine an apparent consumption together with the current engine speed of the internal combustion engine and/or the pressure of the fuel at the Inlet and/or outlet of the Internal combustion engine and then to take this into account in comparable phases (in fueled operation). Furthermore, the apparent consumption together with the high pressure (rail pressure) of the injection system can also be determined if this pressure suddenly drops, for example after an emergency stop of the internal combustion engine. Alternatively, during the warming up of the internal combustion engine the apparent consumption is determined as a function of the changing temperature of the fuel return flow. In this case it may be advantageous for such characteristic operating phases to be carried out multiple times in the identification phase and to be detected as a function of other changing parameters, for example as a function of changing pressures and/or temperatures in the part-volumes of the measurement circuit.

BRIEF DESCRIPTION OF THE DRAWINGS

The invention is explained in greater detail below with reference to the embodiment of devices according to the invention as illustrated schematically in the drawings wherein.

DETAILED DESCRIPTION OF THE DEPICTED EMBODIMENTS

Figure 1:
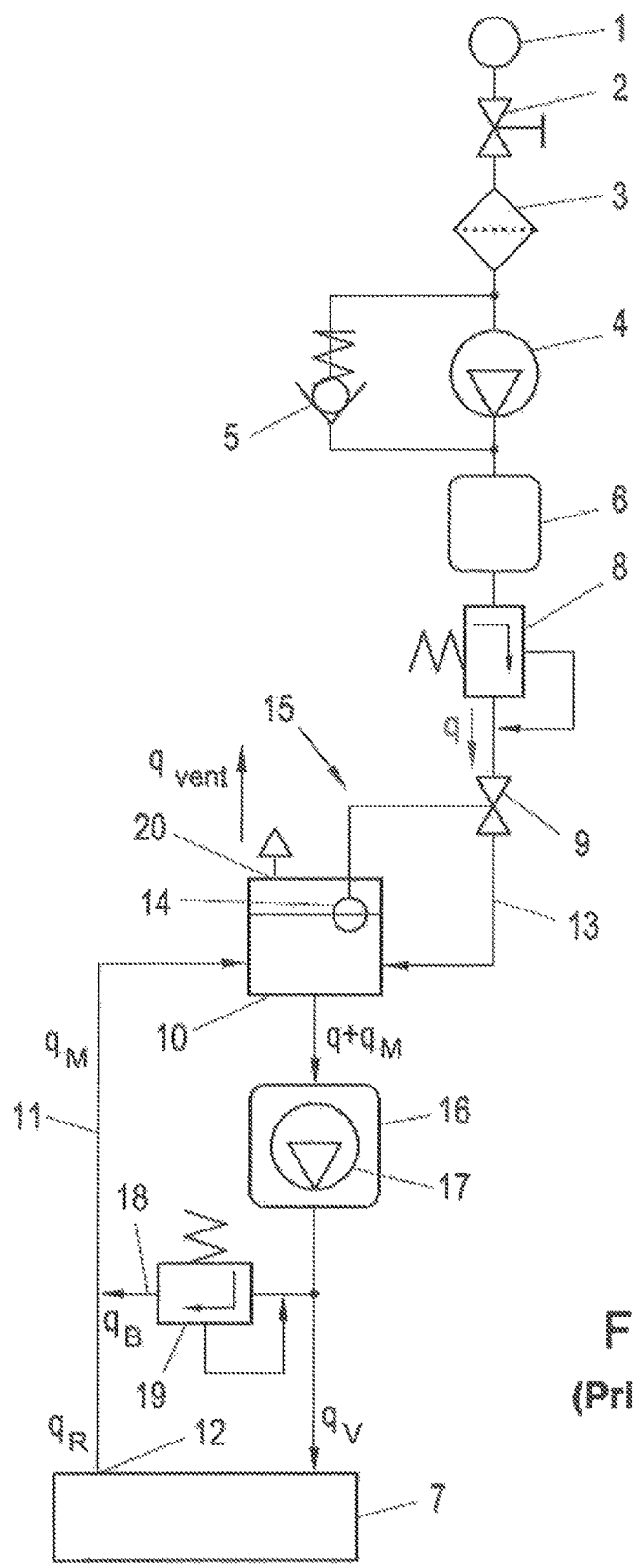
FIG. 1 shows a device for measuring the dynamic fuel consumption of an internal combustion engine according to the previously known prior art.

In the device according to FIG. 1, which represents known prior art, the fuel taken from a supply line (not shown in greater detail) or a fuel tank at a connection 1 flows through a shut-off valve 2 and a fuel filter 3 to an intake pump 4 which has an overflow valve 5 connected in parallel. The consumption sensor 6 which determines the actual fuel consumption of the fuel system 7 of an internal combustion engine (not shown here) is disposed after the intake pump. For precise regulation of the pressure in the intake of the pressure in the intake q for the fuel an intake pressure regulator 8 can be provided, by which the fuel which is thus preconditioned in terms of pressure is supplied to a control valve 9, designed here as a float valve, of a venting tank 10.

The venting tank 10 is connected to a return pipe 11 from the outflow side 12 of the fuel system 7 and also to the intake line 13 from the control valve 9 and has a filling level regulator 15 formed here by the control valve 9 and the associated float 14, by means of which the fuel mass in the filling volume of the venting tank 10 together with its connecting lines can be kept at least largely constant.

A conditioning system 16 with a system pump 17, by means of which for example the fuel pressure and/or the fuel temperature can be set precisely, is disposed in the intake line 13 to the fuel system 7 after the venting tank 10. Furthermore, a bypass line 18 (optionally with differential pressure regulator or pressure regulator 19) is provided which branches off from the intake line 13, whereby the feed flow and the return flow can be set to a negligibly small pressure difference or a pressure prescribed for the feed flow in the system.

The venting flow at the venting connection 20 of the venting tank 10 is designated as $q_{vent}$; $q_V$ designates the feed flow to the fuel system 7; $q_R$ designates the return flow from the fuel system 7; $q_B$ designates the bypass flow via the bypass line 18; $q_M$ designates the return flow from the measurement circuit into the venting tank 10 and $q+q_M$ designates the withdrawal flow in the withdrawal line 24 from the venting tank 10.

The excess fuel from the outflow side 12 of the fuel system 7 (return flow $q_R$), which also serves inter alia for cooling and lubrication of the fuel system 7, should not, because of the measurement, be led past the consumption sensor 6 back into a tank or into the fuel feed line F, but must remain in the actual measurement circuit and thus must be fed to the line between the consumption sensor 6 and the conditioning system 16. However, since the quantity of gases transported with the returned fuel (vaporized fuel and optionally also compressed air and combustion gas from the internal combustion engine) can also be considerable, these gases must be completely removed as quickly as possible from the returned fuel, for which purpose the venting tank 10 is disposed before or at the confluence of the returned fuel and the fuel freshly fed from the consumption sensor 6, so that the conditioning system 16 and consequently the fuel system 7 can be supplied with bubble-free fuel. In order that the consumption sensor 6 can measure the actual consumption in an up-to-date and accurate manner and indicates the least possible apparent consumption, the fuel mass must be as constant as possible in the entire measurement range and naturally above all in the venting tank 10 with its relatively large volume). This purpose is served by the control valve 9 with its float 14, which opens the intake when the filling level in the venting tank 10 drops below a specific level. Thus, it can be ensured that precisely so much fuel reaches the venting tank from the consumption sensor 6 that the fuel mass in the venting tank 10 remains constant.

However, in this device according to the prior art this only functions on the condition that at any time at least the same or a greater volume of fuel is withdrawn from the venting tank 10 via the withdrawal line 24 than is delivered via the return line 11.

However, for example upon stopping of the internal combustion engine, when the quantity of fuel stored in the high-pressure part of the injection system flows back, or upon reduction of the quantity injected and the speed of the internal combustion engine (coast-down) at times a greater volume can be delivered than removed, so that the filling level in the venting tank 10 rises further when the control valve 9 is shut off and the consumption sensor 6 does not display the return flow as negative apparent consumption but as zero consumption.

In order to prevent the apparent consumptions caused by changes to the fuel mass stored in the measurement circuit and the measurement errors resulting therefrom, or at least to be able to take these into account in the determination of the actual consumption, the devices according to the present invention as shown in FIGS. 2-9 have, at one of the connections of the venting tank 10, filling level regulators 15 which enable not only a regulated intake but also a regulated fuel withdrawal from the venting tank 10 by means of a circulation pump 22 as well as a control valve 9 connected thereto, through which the flow passes continuously and which is opened more or less as a function of the filling level to be regulated. Thus this control valve 9 is not operated as usual in the vicinity of the "open/closed" switch point, but regardless of the current fuel consumption in an operating point with a permanent fluid flow which is advantageous for maintaining the filling volume precisely and as constant as possible.

Figure 2:
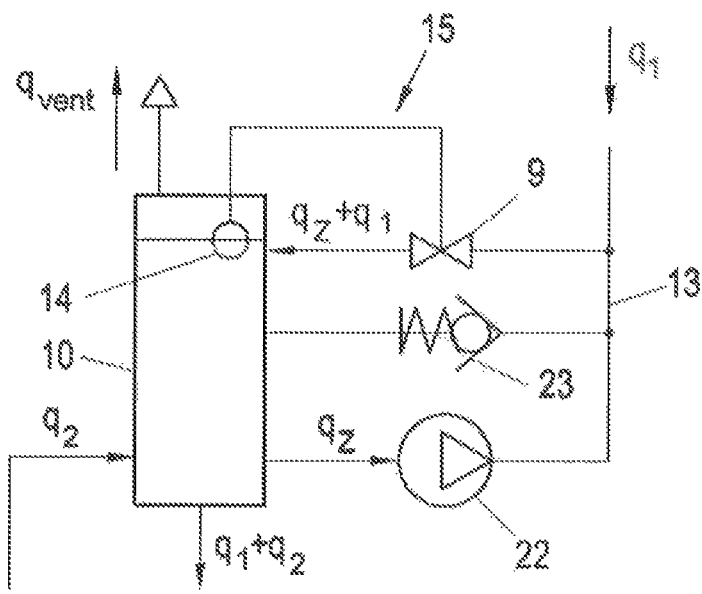
FIGS. 2 to 6 shows details of the surroundings of the venting tank of a corresponding device according to the invention in different configurations.

According to FIG. 2, the venting tank 10 is provided with the corresponding circulation circuit on the intake side (corresponding to the intake line 13 in FIG. 1) and has a control valve 9 through which the flow passes towards the venting tank 10. Thus, depending upon whether the control valve 9 is opened more or less as a function of the position of the float 14, the filling level in the venting tank 10 can be positively or negatively corrected. An overpressure valve 23, which here enables the reduction of raised pressure in the circulation circuit towards the tank, is also disposed in parallel with the circulation pump 22.

Figure 3:
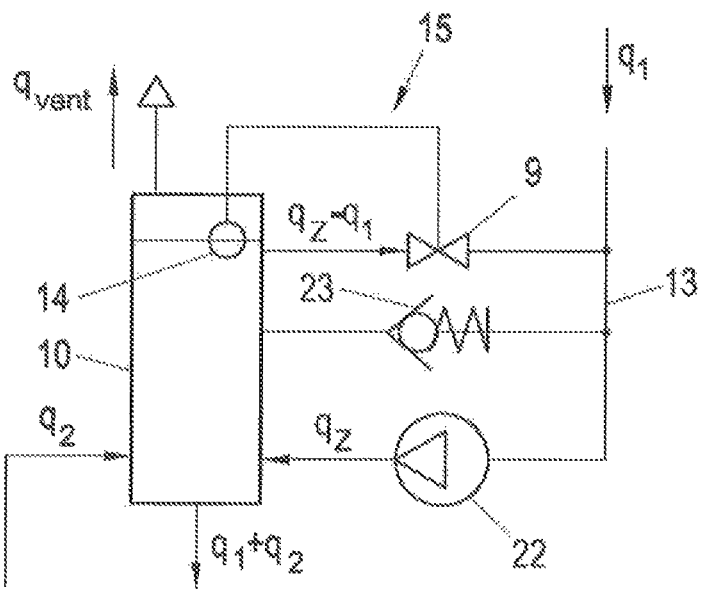

According to FIG. 3, the circulation circuit with the circulation pump 22 and control valve 9 is again provided on the inflow side (intake line 13), wherein the flow now passes through the control valve 9 away from the venting tank 10, and thus in contrast to the arrangement according to FIG. 2 the circulation pump 22 does not convey out of the venting tank 10 but into the venting tank 10. Thus a positive and negative correction of the filling level in the venting tank 10 is also advantageously possible with a continuous flow through the more or less opened control valve 9. The overpressure valve 23 here enables a pressure reduction in the direction of the intake line 13.

Figure 4:
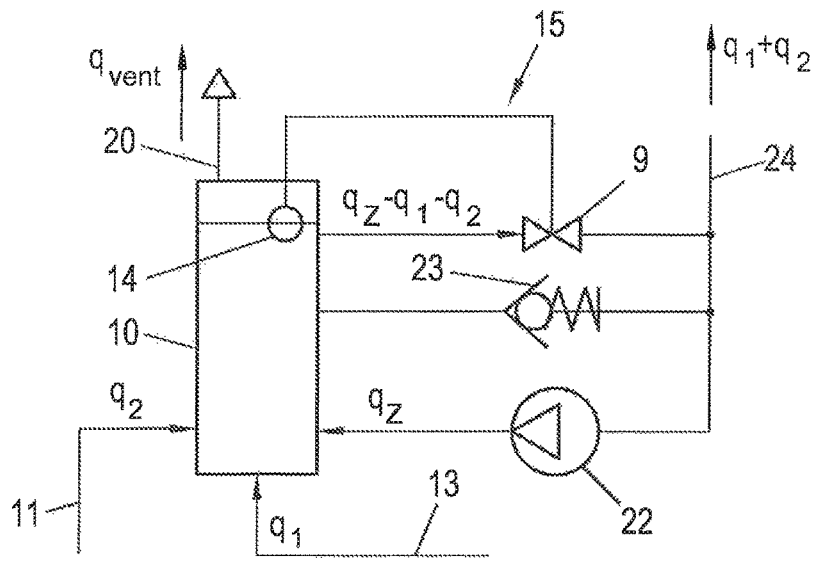

According to FIG. 4, the circulation circuit is provided on the outflow side of the venting tank 10. The inflow q1 of bubble-free fuel from the intake line 13 in FIG. 1 or optionally from the bypass line 18 in FIG. 1 is shown here opening into the venting tank 10 at the bottom. The inflow q2 of fuel rich in gas bubbles of from the return flow of the internal combustion engine 12 (not shown here) in FIG. 1 takes place via the return line 11. The outlet line 24 is connected to the conditioning system 16 (not shown here in further detail) in FIG. 1. Thus, the filling level regulator 15 here is formed by the control valve 9, which is disposed at the outlet connection of the venting tank 10 and through which the flow passes more or less continuously, together with the circulation pump 22—here too an overpressure valve 23 is provided which enables a pressure reduction into the intake line to the conditioning system.

The flow direction in the components of the circulation circuit 9, 22, 23 may be directed as shown here or of course also differently, as in FIGS. 2 and 3.

Figure 5:
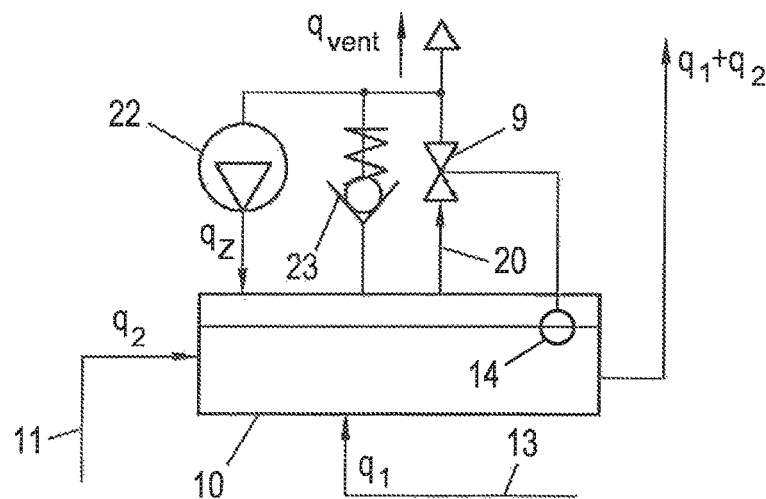

According to FIG. 5, the circulation circuit is provided on the venting side of the venting tank 10. Thus the control valve 9 controlled by the float 14 regulates the continuous gas flow via the circulation pump 22, so that the gas pressure in the venting tank and thus likewise the filling level in the venting tank 10 can be both positively and negatively corrected. The flow direction into the components of the circulation circuit 9, 22, 23 may be directed as shown here or of course also differently, as in FIGS. 2 and 3.

Figure 6:
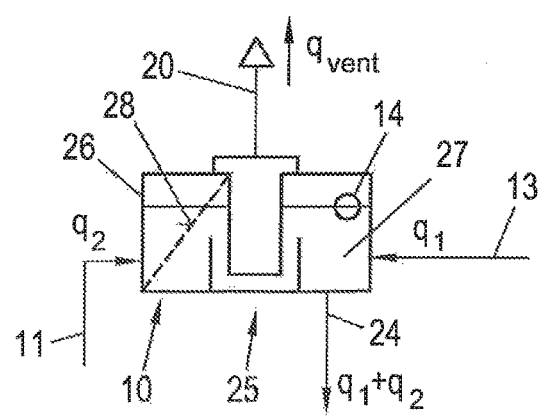

According to FIG. 6, the venting tank 10 of a device according to the invention has two regions 26, 27 which are separated by fittings 25, and which communicate hydraulically with negligible flow resistance and at the same level with respect to gravity, and thus in each case have the same pressure on their connection. Moreover, lattice-like fittings 28 for improvement of the elimination of the gas bubbles are provided in the region 26 connected to the return line 11 from the fuel system. The float 14 belonging to the filling level regulator 15 is disposed in the second region 27 which thus already contains mostly bubble-free fuel. It serves for regulating the filling level according to FIGS. 2-4 for example, or optionally also according to FIG. 5, since the venting line 20 is likewise connected to both regions 26, 27.

Figure 7:
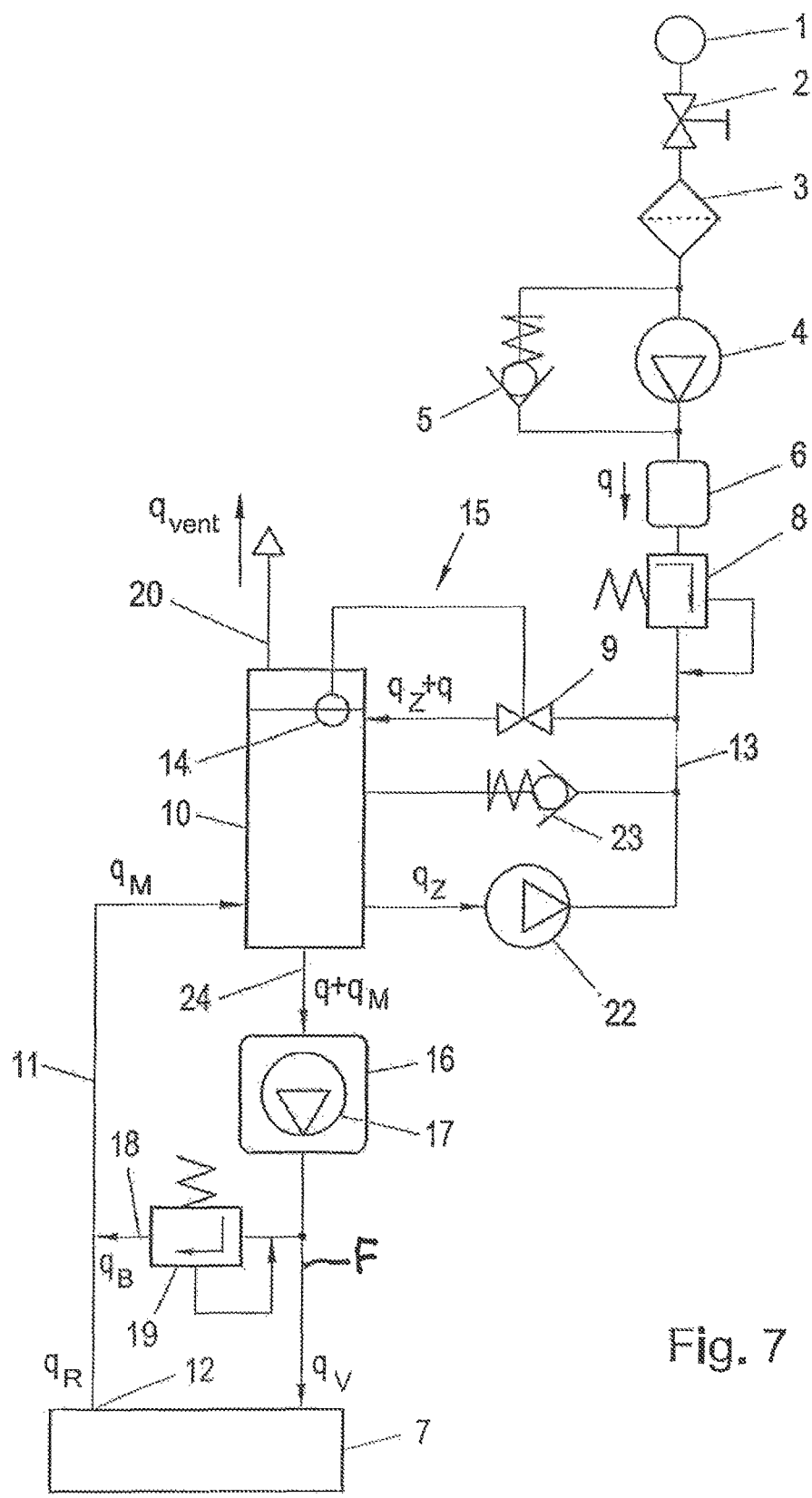
FIGS. 7 to 9 show further exemplary embodiments of devices according to the invention.

The device according to the invention as shown in FIG. 7 corresponds, with regard to the basic structure, to the known design described with reference to FIG. 1. Parts which are the same are provided with the same reference numerals as in FIG. 1. Unlike FIG. 1, in FIG. 7 the arrangement according to the invention of a circulation circuit on the inflow side to the venting tank is as shown in detail in FIG. 2 and as described above with reference to FIG. 2. Thus in order to avoid repetitions, reference is merely made here to the description of FIG. 1 and FIG. 2.

Figure 8:
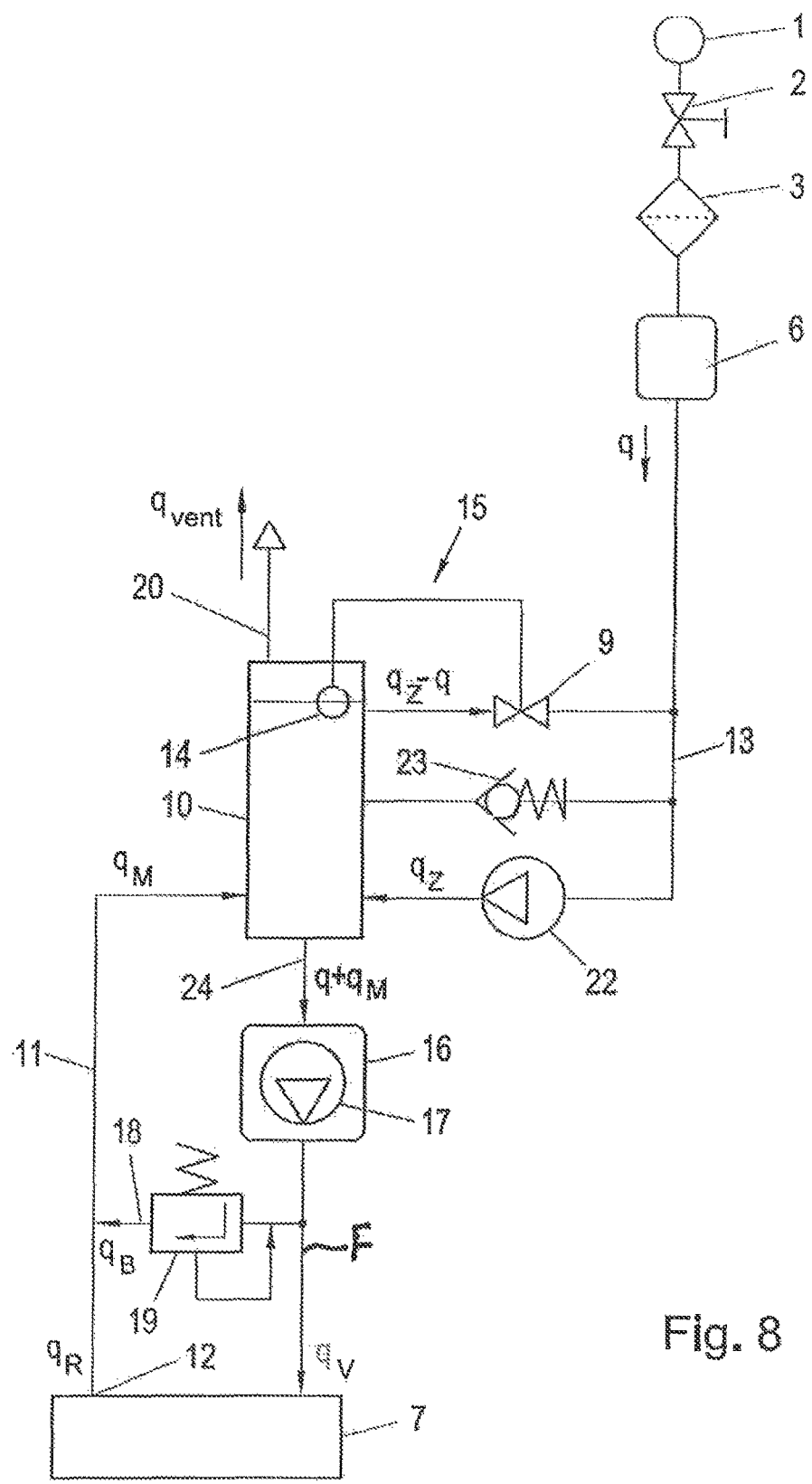

FIG. 8 corresponds substantially to the configuration according to the invention as shown in FIG. 3 with a device which is basically known from FIG. 1. Here, too, with regard to the description reference is made to the statements with regard to FIG. 1 and FIG. 3. Unlike FIG. 1 and FIG. 7, in the device according to FIG. 8 no intake pump 4 and no intake pressure regulator 8 is provided, since the circulation pump 22 which conveys into the venting tank 10 and against the pressure set there also takes on the function of the Intake pump 4 and thus makes this advantageous saving possible.

Figure 9:
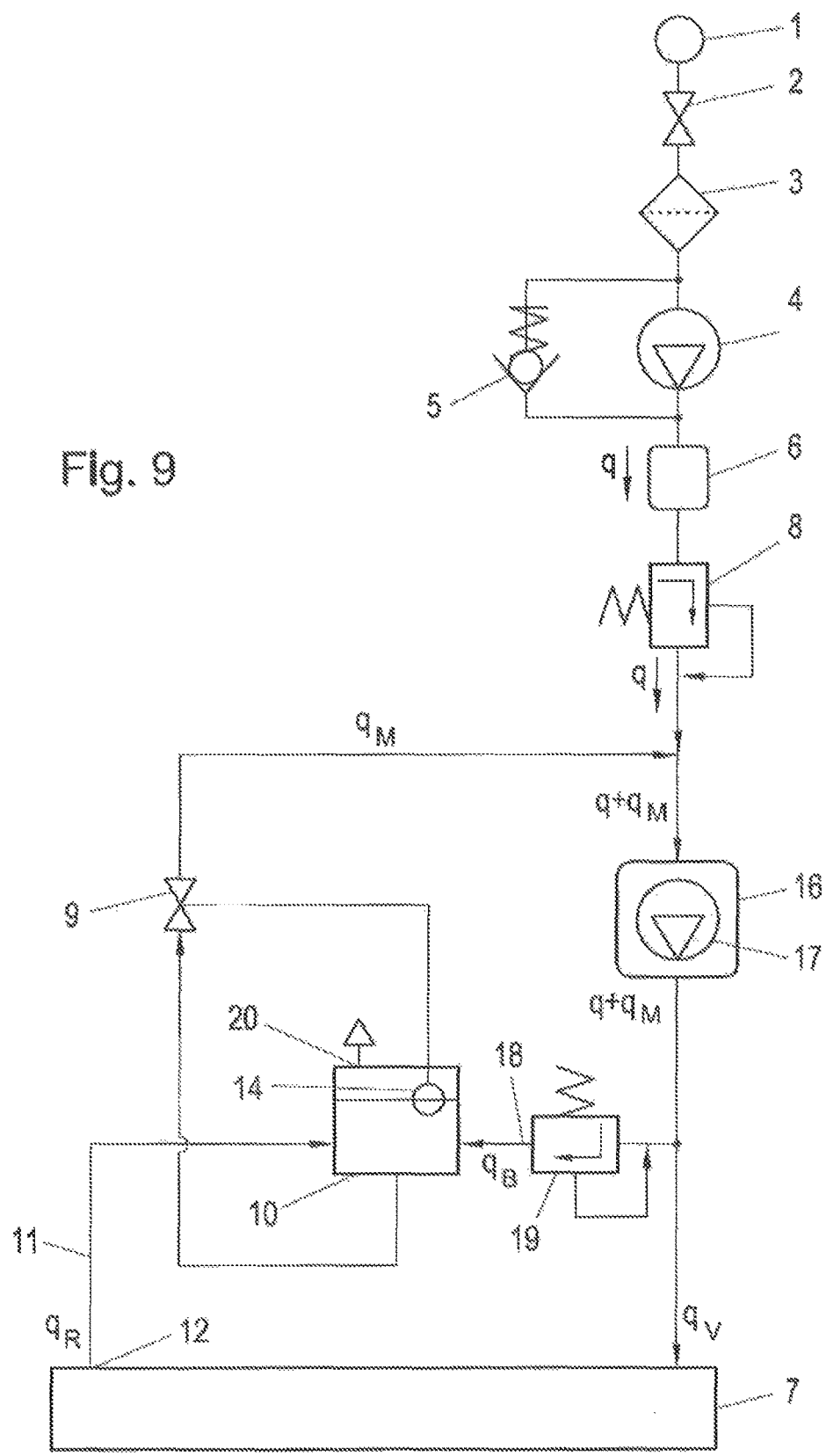

In the embodiment according to FIG. 9 the venting tank 10 is now disposed on the junction of the bypass line 18 with the return line 11 from the fuel system, wherein the flow through the control valve 9 passes away from the venting tank 10 and the control valve is located on the outflow side of the tank. The system pump 17 in the conditioning system 16 maintains a continuous flow through the measurement circuit and thus also through the control valve 9, and advantageously serves here simultaneously as a circulation pump 22 (in the previous embodiment according to the invention).

The invention claimed is:

1. A device for continuous measurement of dynamic fuel consumption of an internal combustion engine, comprising a fuel system for supplying fuel to tile internal combustion engine, a venting tank which is disposed in a return line from an outflow side of the fuel system an intake line for supplying the fuel system and includes a filling level regulator for maintaining fuel mass in a filling volume at-least generally constant, wherein the filling level regulator located at a connection of the venting tank includes a circulation pump as well as a control valve connected thereto and through which passes fuel, and which is opened as a function of the filling level to be regulated.

2. The device according to claim 1, wherein the circulation pump and the control valve are disposed in a circulation line between the venting tank and the intake line.

3. The device according to claim 1, wherein the circulation pump and the control valve are disposed in a withdrawal line of the venting tank.

4. The device according to claim 1, wherein the circulation pump and the control valve are disposed at a degassing connection of the venting tank.

5. The device according to claim 1, wherein an overpressure valve is disposed in parallel with the circulation pump.

6. The device according to claim 1, wherein the venting tank has at least two regions which are separated by fittings and communicate hydraulically with negligibly small flow resistance.

7. The device according to claim 1, wherein the venting tank with the control valve is disposed where a bypass line extending from a feed line connects with the return line.

8. The device according to claim 2, wherein a fuel pump which is also otherwise required in a measuring system serves directly as the circulation pump.

9. The device according to claim 4, wherein a compressor pump of a compressed air system of the internal combustion engine serves directly as the circulation pump.

10. The device according to claim 1, including a conditioning system for temperature conditioning of returned fuel.

11. A method for continuous measurement of dynamic fuel consumption of an internal combustion engine, wherein the unconsumed fuel returned from a fuel system of the internal combustion engine is degassed in a venting tank, wherein a filling level is maintained generally constant, and is again added to an inlet to an inflow side of the fuel system, wherein a continuous flow of a medium (delivery or removal) regulated as a function of the filling level takes place at a connection of the venting tank with a continuous circulating flow of fuel or a continuous delivery or removal of a gaseous medium.

12. The method according to claim 11, wherein a continuous circulating flow of fuel takes place between the venting tank and an intake line for the fuel.

13. The method according to claim 11, wherein a continuous circulating flow of fuel takes place between the venting tank and a withdrawal line for the fuel.

14. The method according to claim 11, wherein a continuous delivery or removal of gaseous medium takes place at a degassing connection of the venting tank.

15. The method according to claim 11, wherein medium flows continuously into the venting tank through a partially opened control valve.

16. The method according to claim 11, wherein the continuous flow of medium is guided out of the venting tank through a partially opened control valve.

17. The method for continuous measurement of dynamic fuel consumption of an internal combustion engine according to claim 11, wherein in an identification phase apparent consumption occurring is measured at least at one operating point of the internal combustion engine with a previously known fuel consumption, and is detected depending upon values determined at least approximately for temperature and pressure of fuel in part-volumes of a measurement circuit and upon values output by the internal combustion engine control unit (ECU) for engine speed, current fuel consumption and rail pressure, and definitive parameters for an apparent consumption are determined from these data and are taken into account by modelling an actual consumption measurement.

18. The method according to claim 17, wherein the internal combustion engine is trailed with zero consumption in an identification phase.

19. The method according to claim 17, wherein self-learning algorithms which are known per se can be used for adaptation to changes during a testing operation and for ongoing optimization of accuracy of measurement.

20. The method according to claim 19, wherein the measured or predetermined values for pressures, temperatures and fuel consumption, and values output by the internal combustion engine control unit for engine speed, rail pressure and current fuel consumption in each case, are evaluated at least together with a value of their change, in order to determine a model-related redundancy of these values of a determination of important system characteristics.

21. The method according to claim 20, wherein the system characteristics include densities, compressibilities, coefficients of expansion, and time constants of a response behavior of measurement lines and sensors.

\* \* \* \* \*